United States Patent [19]

Shannon

[11] Patent Number: 5,130,829
[45] Date of Patent: Jul. 14, 1992

[54] ACTIVE MATRIX LIQUID CRYSTAL DISPLAY DEVICES HAVING A METAL LIGHT SHIELD FOR EACH SWITCHING DEVICE ELECTRICALLY CONNECTED TO AN ADJACENT ROW ADDRESS CONDUCTOR

[75] Inventor: John M. Shannon, Whyteleafe, England

[73] Assignee: U.S. Philips Corporation, New York, N.Y.

[21] Appl. No.: 712,218

[22] Filed: Jun. 7, 1991

[30] Foreign Application Priority Data

Jun. 27, 1990 [GB] United Kingdom ............. 9014257

[51] Int. Cl.⁵ ..................................... G02F 1/13
[52] U.S. Cl. ........................... 359/59; 359/67; 359/88
[58] Field of Search ........... 350/333, 334, 336, 339 R; 359/58, 59, 60, 67, 88; 340/784

[56] References Cited

U.S. PATENT DOCUMENTS

| | | | |
|---|---|---|---|
| 4,687,298 | 8/1987 | Aoki et al. | 350/334 |
| 4,704,002 | 11/1987 | Kikuchi et al. | 350/334 |
| 4,723,838 | 2/1988 | Aoki et al. | 350/336 |
| 4,810,060 | 3/1989 | Ukai | 350/333 |
| 4,928,095 | 5/1990 | Kawahara | 340/784 |
| 4,936,656 | 6/1990 | Yamashita et al. | 350/333 |
| 4,948,231 | 8/1990 | Aoki et al. | 350/334 |

FOREIGN PATENT DOCUMENTS

| | | | |
|---|---|---|---|
| 0373565 | 6/1990 | European Pat. Off. | 340/784 |
| 0042635 | 2/1989 | Japan | 350/334 |

Primary Examiner—Stanley D. Miller
Assistant Examiner—Huy K. Mai
Attorney, Agent, or Firm—Edward W. Goodman

[57] ABSTRACT

An active matrix liquid crystal display device includes on a first substrate (30) a row and column array of picture element electrodes (20), associated switching devices (11), e.g. a-Si or polysilicon TFTs, and sets of row and column address conductors (14,16) to which selection and data signals are applied respectively, the picture elements being driven a row at a time in sequence by scanning the row conductors with a selection signal. Each switching device (11) is provided with a metal light shield (45) extending over the active region of the device (11) which is connected (46) electrically to the row address conductor (14) adjacent the one to which the switching device is connected. Because the adjacent row conductor is at a reference potential for most of the time, parasitic capacitance effects due to the metal light shield are negligible.

14 Claims, 4 Drawing Sheets

ACTIVE MATRIX LIQUID CRYSTAL DISPLAY DEVICES HAVING A METAL LIGHT SHIELD FOR EACH SWITCHING DEVICE ELECTRICALLY CONNECTED TO AN ADJACENT ROW ADDRESS CONDUCTOR

BACKGROUND OF THE INVENTION

1. Field of the Invention

This invention relates to an active matrix liquid crystal display device comprising first and second spaced supporting plates, a row and column array of picture elements each defined by a respective one of a set of electrodes carried on the first plate and an opposing electrode carried on the second plate with liquid crystal material therebetween, and a set of row address conductors on the first plate to which selection signals are applied by a driver circuit, each row of the picture element electrodes on the first plate being connected to an associated one of the set of row address conductors through a respective switching device on the first plate, and each switching device having an associated light shield carried on the first plate.

2. Description of the Related Art

Active matrix addressed liquid crystal display devices of the above kind and employing thin film transistors, (TFTs), as switching devices for the picture elements are generally well known. In these display devices, the gates of the TFTs are connected to the row address conductors to which gating signals are applied in sequence and the source terminals of the TFTs are connected to a set of column address conductors also on the first plate, to which data signals are applied. A single electrode common to all picture elements is provided on the second plate. Such display devices can be used to display monochrome or color video pictures, for example TV pictures. The photoconductive properties of the semiconductor material used in the addressing TFTs, particularly for example amorphous silicon or polysilicon materials, can influence significantly the off resistance of the transistor which results in poor display quality if this resistance is not adequately high. The display degradation caused by photocurrents can be especially severe where the display device is used as part of a projection display system in view of the high light intensities.

One common approach to satisfying the need for light shielding of the switching devices has been to provide a light shield for each switching device which extends over the structure of the switching device on the first plate. Shields comprising pads of light absorbing insulating material have been used but these forms of light shields are not always sufficiently absorbent and produce heat as a result of the absorption of light. It is known also to provide a light shield in the form of an isolated pad of light reflecting metal overlying the semiconductor channel region of the TFT and separated therefrom by an intervening insulator layer. Discrete metal pad light shields are much better at shielding the channel region and do not generate heat, However, their use has been severely limited as they have suffered from the disadvantage of introducing undesirable parasitic capacitance effects, for example between the source and drain terminals or the source or drain and gate terminals of a TFT depending on the orientation of its gate with respect to the shield. Also they can float to such a potential that they begin to act like a gate terminal of the TFT.

In the English-language abstract of JP-A-63-276031, it is proposed that a metal pad light shield for a TFT is connected electrically to the column conductor (video signal line) associated with and physically adjacent the TFT concerned so as to avoid problems caused by the light shield becoming electrified during the manufacturing process. While those problems may be avoided, the disadvantage of deleterious capacitive coupling effects during operation remains, especially in the case where the light shield overlies source and drain regions as well as the channel region of the TFT as would be preferable.

SUMMARY OF THE INVENTION

It is an object of the present invention to provide an improved active matrix liquid crystal display device using metal light shields for the switching devices.

It is another object of the present invention to provide light shields for the switching devices of an active matrix display device which are of metal and with which the problems of parasitic capacitances are to a large extent avoided.

According to the present invention, an active matrix liquid crystal display device of the kind described in the opening paragraph is characterized in that each light shield comprises a layer of metal which is connected electrically to a row address conductor adjacent the one to which the switching device is connected. Although the interconnection between the light shield at the region of the switching device and the adjacent row address conductor could be achieved through a separately-formed layer, the light shield preferably comprises a layer of metal extending from the switching device to the adjacent row address conductor.

The invention derives from the recognition that if a metallic light screening layer is contacted to an adjacent row address conductor, the increase in capacitive cross-talk can be negligible. In operation, each row address conductor is at a predetermined potential for most of the time. In conventional TFT matrix addressed display devices, the drive circuit applies to the row address conductors a constant reference potential, for example ground potential, except during the comparatively very short period when a gating pulse is applied to turn on the TFTs associated with the row address conductor. As a result of the presence of this predetermined potential, detrimental capacitive coupling effects are avoided while the benefits of using a metal, reflective, light shield are retained. Moreover, the light shield can therefore extend in coverage over at least a major part of the area of the switching device, for example over at least part of the drain contact region, and possibly at least part of the source region, as well as the channel region, to afford more extensive light screening e.g. laterally over the switching device structure, than normally permitted by known isolated metal pad light shields.

Further important advantages and benefits follow from the utilization of the predetermined potential on adjacent row address conductors. The light shields can easily be provided with little additional processing being required and, significantly, with the physical dimensions of the interconnection between each light shield at the switching device and the adjacent row address conductor being minimal and substantially within the space between two successive row address conductors. Consequently, non-contacting cross-overs between these interconnections and row address conductors or column address conductors are not required. Conductor cross-overs are a common source of defects and can lead to poor yields. Avoiding the need for additional cross-overs is therefore a considerable benefit.

Preferably, the light shield is connected to the preceding adjacent row address conductor. This ensures that any effect which might be caused to the display from a picture element as a consequence of a selection signal being applied to the adjacent row address conductor is short-lived, and hence imperceptible, since the picture element is loaded almost immediately after the appearance of the selection signal on the preceding adjacent row address conductor with its intended display information as a result of the supply of the following selection signal to the row address conductor associated with that picture element.

The light shield may extend over the switching device with the switching device situated between the light shield and the surface of the first plate, for example in the case of the switching device comprising an inverted staggered type of amorphous silicon TFT in which the gate terminal lies between the channel region and the supporting plate. Alternatively, the light shield may extend over the switching device and between the switching device and the surface of the first plate, for example in the case of the switching device comprising a top-gate polycrystalline silicon TFT in which the channel region is situated between the gate terminal and the supporting plate.

BRIEF DESCRIPTION OF THE DRAWINGS

Active matrix liquid crystal display devices in accordance with the invention will now be described, by way of example, with reference to the accompanying drawings, in which.

DESCRIPTION OF THE PREFERRED EMBODIMENTS

Figure 1:
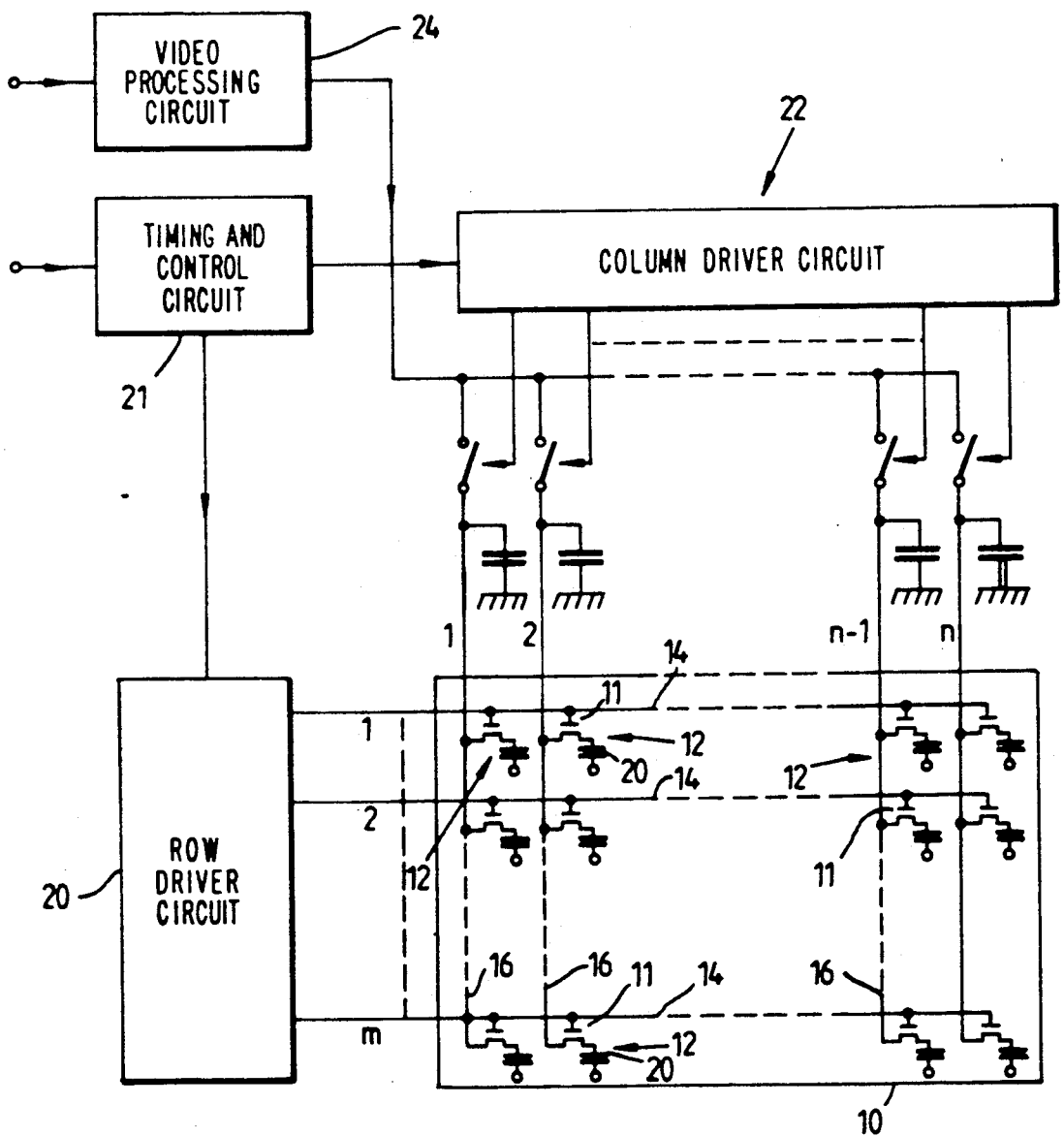
FIG. 1 is a schematic circuit diagram of an active matrix addressed liquid crystal display device according to the invention.

It should be understood that the Figures are merely schematic and are not drawn to scale. In particular certain dimensions, such as the thickness of layers, may have been exaggerated while other dimensions may have been reduced. It should also be understood that the same reference numerals have been used throughout the Figures to indicate the same or similar parts.

Referring to FIG. 1, the display device, which is suitable for displaying video pictures, comprises an active matrix addressed liquid crystal display panel 10 having a row and column array of picture elements which consists of m rows (1 to m) with n horizontally arranged picture elements 12 (1 to n) in each row. Only a few of the picture elements are shown for simplicity.

Each picture element 12 is associated with a respective switching device in the form of a thin film transistor, TFT, 11. The gate terminals of all TFTs 11 associated with picture elements in the same row are connected to a common row conductor 14 to which, in operation, switching (gating) signals are supplied. Likewise, the source terminals associated with all picture elements in the same column are connected to a common column conductor 16 to which data (video) signals are applied. The drain terminals of the TFTs are each connected to a respective transparent picture element electrode 20 forming part of, and defining, the picture element. The conductors 14 and 16, TFTs 11 and electrodes 20 are carried on one transparent plate while a second, spaced, transparent plate carries an electrode common to all picture elements. Liquid crystal is disposed between the plates.

The display panel is operated in conventional manner. Light from a light source disposed on one side enters the panel and is modulated according to the transmission characteristics of the picture elements 12. The device is driven on a row at a time basis by scanning the row conductors 14 sequentially with a gating (selection) signal so as to turn on each row of TFTs in turn and applying data (video) signals to the column conductors for each row of picture display elements in turn as appropriate and in synchronism with the gating signals so as to build up a complete display picture. Using one row at time addressing, all TFTs 11 of the addressed row are switched on for a period determined by the duration of the gating signal corresponding to a TV line time T1 or less during which the video information signals are transferred from the column conductors 16 to the picture elements 12. Upon termination of the gating signal, the TFTs 11 of the row are turned off for the remainder of the field time Tf thereby isolating the picture elements from the conductors 16 and ensuring the applied charge is stored on the picture elements until the next time they are addressed, usually in the next field period.

The row conductors 14 are supplied successively with gating signals by a row driver circuit 20 comprising a digital shift register controlled by regular timing pulses from a timing and control circuit 21. In the intervals between gating signals, the row conductors 14 are supplied with a substantially constant reference potential by the drive circuit 20. Video information signals are supplied to the column conductors 16 from a column driver circuit 22, here shown in basic form, comprising one or more shift register/sample and hold circuits. The circuit 22 is supplied with video signals from a video processing circuit 24 and timing pulses from the circuit 21 in synchronism with row scanning to provide serial to parallel conversion appropriate to the row at a time addressing of the panel 10.

Figure 2:
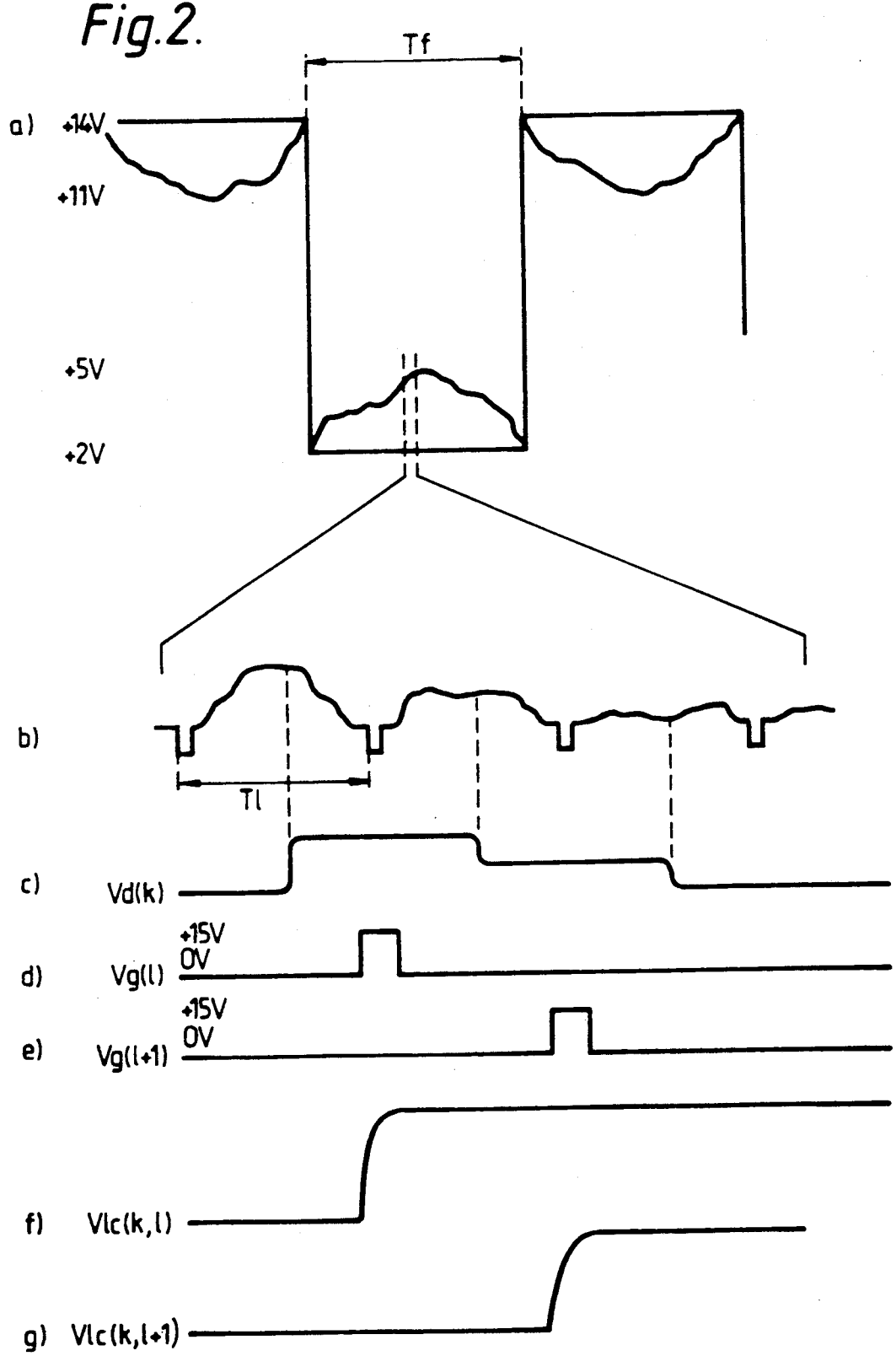
FIG. 2 illustrates typical waveforms present in operation of the display device of FIG. 1.

FIG. 2 illustrates typical waveforms present in operation of the display device when displaying TV pictures, although it will be appreciated that the form of waveforms and the potential levels indicated are given by way of example only and can be varied, for example by using alternative known driving schemes. FIG. 2a shows part of the waveform from the video processing circuit 24. A representative portion of the waveform of FIG. 2a, as indicated by the brackets, and comprising information for three complete TV lines, each of duration T1, is shown greatly enlarged in FIG. 2b. FIG. 2c illustrates an example of the video data voltage appearing on a typical column conductor 16, in this case the data voltage, Vd(k) appearing on the kth column conductor and consists of a series of voltage levels, each of a duration T1, determined by sampling the video waveform during each line at a particular point as indicated by the dotted lines. The FIGS. 2d and 2e illustrate the row selection (gating) signal waveforms Vg applied to two successive row address conductors 14, namely the 1th and the (1+1)th conductors which in this example are shown applied during the subsequent TV line blanking period for simplicity. Alternative forms of column driver circuits 22, as known in the art, can be used to provide longer charging periods. The row conductors 14 are sequentially scanned and the gating pulses applied successively to preceding and succeeding row address conductors are of course correspondingly staggered. The counter, common, electrode carried on the opposing supporting plate is at a constant reference potential. FIGS. 2f and 2g show the resulting voltages, VLC, appearing on the electrodes 20 of the picture elements associated respectively, with the k and 1 and k and (1+1) column and row address conductors.

In order to protect the TFTs from unwanted photo-current effects, all the TFTs, apart from those of the first row of picture elements, are each provided, in accordance with the invention, with a metallic light shield which is connected electrically with a row address conductor adjacent the one to which the TFT concerned is connected. Examples of these light shields will now be described with regard to two different embodiments of the display device employing respectively amorphous silicon TFTs and polysilicon TFTs.

Figure 3:
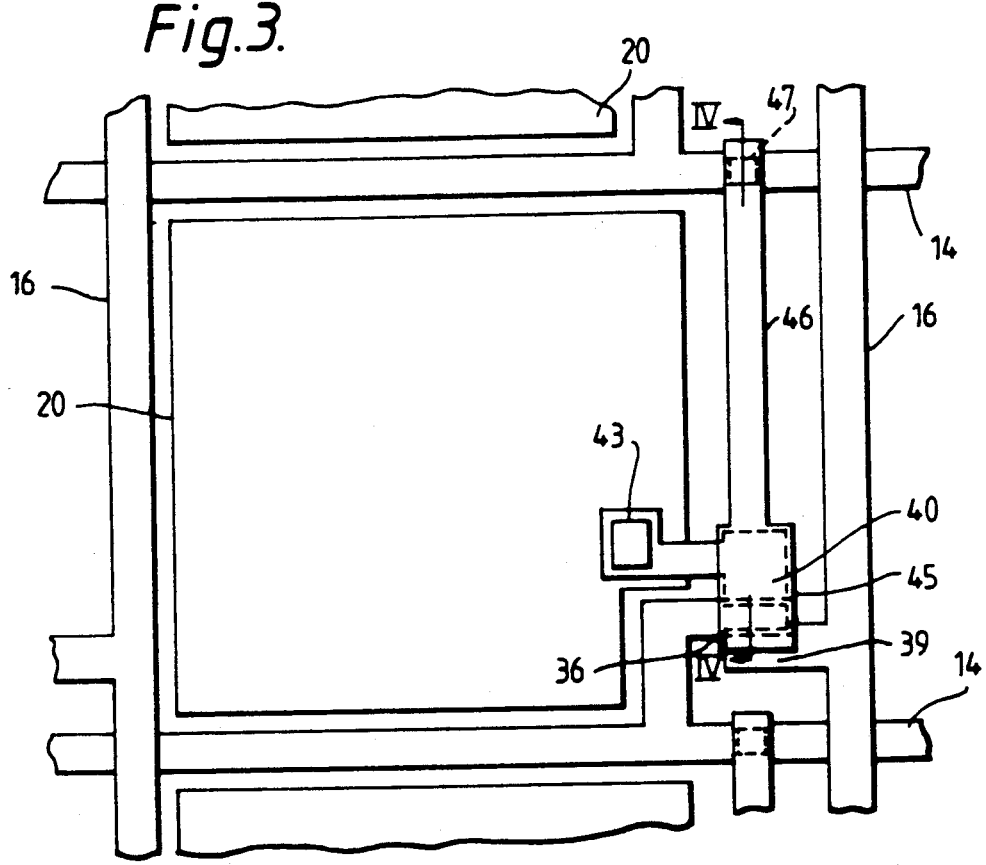
FIG. 3 is a schematic plan view of a part of a first embodiment of the display device.

FIG. 3 shows in simplified schematic form a plan view of a typical picture element and associated TFT, and row and column address conductor portions of an example of the display device using inverted staggered type amorphous silicon TFTs as the switching devices. A cross-section through the complete display device, along the line IV—IV of FIG. 3 is shown in FIG. 4.

Figure 4:
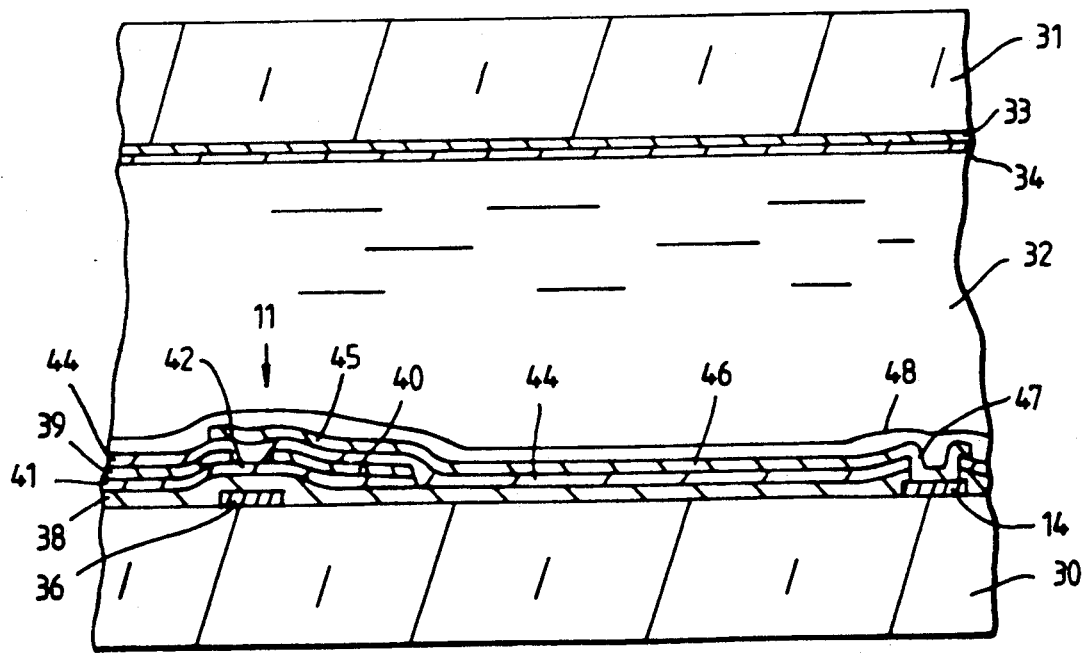
FIG. 4 is a schematic cross-section view through the first embodiment of display device along the line IV—IV of FIG. 3.

Referring to FIGS. 3 and 4, the display device comprises a pair of spaced supporting plates 30 and 31 of glass with twisted nematic liquid crystal material 32 disposed therebetween. The plate 31 carries on its inner surface a continuous transparent ITO electrode 33 common to all picture elements in the array and an LC orientation layer 34.

The plate 30 carries the row and column address conductors 14 and 16, the TFTs 11 and the picture element electrodes 20. At the region of each picture element, the row address conductor 14, for example of aluminum or chromium, has an integrally-formed extension 36 whose end constitutes the TFT's gate terminal. The column conductor 16, of for example aluminum and/or chromium, is insulated from the row conductor where they cross by an intervening layer 38 of insulating material, such as silicon nitride, which also extends over the gate terminal and surrounding areas of the surface of the plate 30. The column conductor 16 is formed with an integral lateral extension 39 which constitutes the source terminal of the TFT. The TFT's drain terminal 40 comprises a layer defined simultaneously with the column conductors from the deposited material and extends onto, and contacts with, the ITO electrode 20 at 43. A semiconductor layer 41 of hydrogenated amorphous silicon material is disposed over the layer 38 and beneath the source and drain terminals 39 and 40 and forms the TFT's channel region 42 overlying the gate terminal 36. A light shield comprising an opaque metallic layer 45, for example of aluminum, or aluminum together with chromium, overlies the channel region 42 and adjacent parts of the layers 39 and 40 with a passivating layer 44 of insulating material such as silicon nitride underlying this metallic layer to separate it from the source and drain terminals 39 and 40 and the channel region 42. The layer 45 has an extension 46 running parallel with the column conductor 16 to an immediately adjacent row address conductor 14 associated with the preceding row of picture elements. This extension contacts electrically with the preceding row address conductor 14 through a window 47 formed in the insulating layers 44 and 38. The extension providing the interconnection between the light shield 45 and the previous row address conductor could instead comprise a layer formed separately from the metallic light shield layer 45 but which contacts both the light shield and the adjacent row conductor, and in this case could be of transparent conductive material such as ITO. The structure on the plate 30 is covered completely by an LC orientation layer 48 similar to the layer 34.

The metallic light shield 45 is of such dimensions as to cover completely the active region of the TFT, including all of the drain contact region. The light shield 45 covers only a small part of the source contact region so as to avoid too much parasitic capacitance with the source contact which needs to be charged when the TFT is turned on. The shield screens the active region highly effectively by reflecting incident light so as to prevent photocurrents in the channel region 42. Light can be directed through the display device in either direction. With light directed onto the plate 31, the shield 45 masks the TFT from direct light and internal reflections while the gate terminal 36 serves to shield the channel region from light reflected in the plate 30 or by the overlying polarizing layer. For light directed onto the plate 30, the roles of the layers 45 and 36 are reversed, accordingly.

Figure 5:
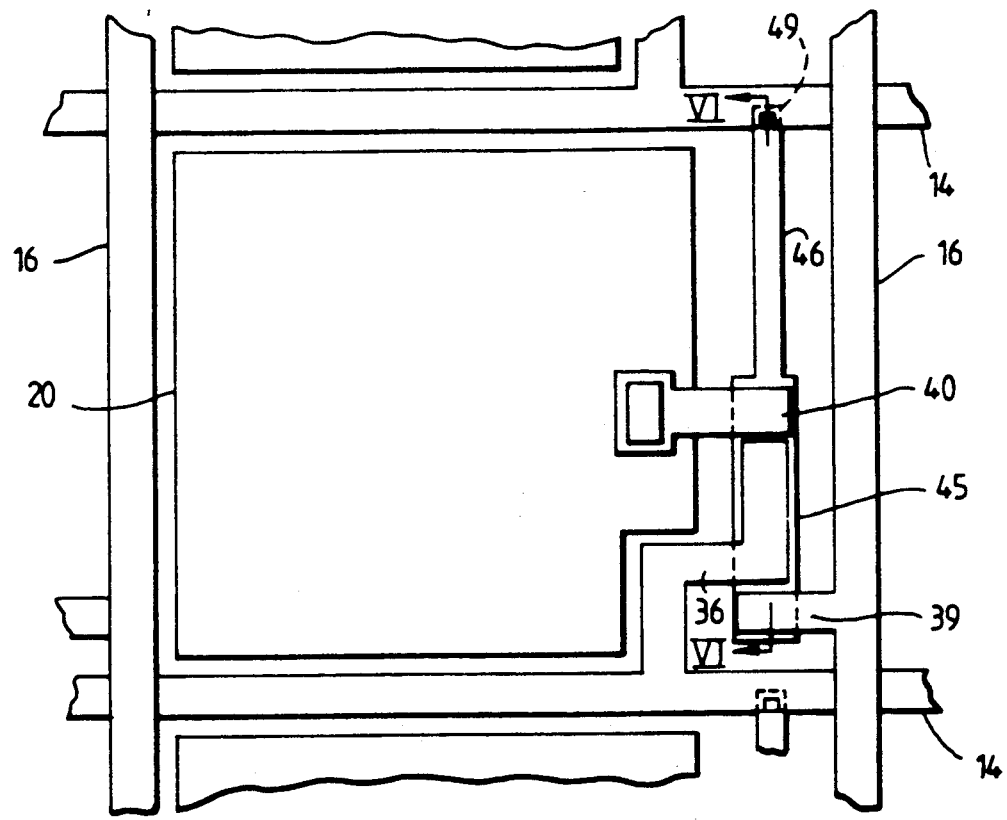
FIG. 5 is a schematic plan view of a part of a second embodiment of the display device.
Figure 6:
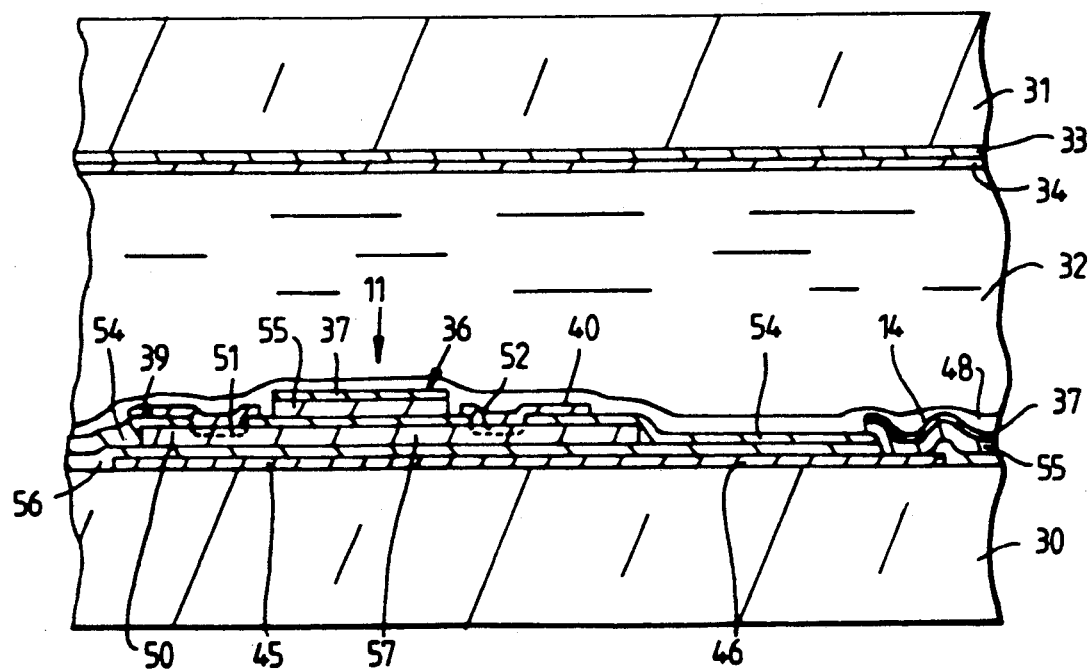
FIG. 6 is a schematic cross-section view through the second embodiment of the display device along the line VI—VI of FIG. 5.

Referring now to FIGS. 5 and 6, these Figures show, respectively, schematic plan and sectional views, corresponding to FIGS. 3 and 4, of an embodiment of the display device using polysilicon TFTs as the switching devices.

The row and column conductors 14 and 16 are a similar shape as before and again are defined with integral extensions 36 and 39 constituting the TFTs gate and source terminals. The column conductor 16 may similarly be of aluminum and/or chromium. The row conductor 14, and gate terminal 36, are of doped polysilicon with an overlying layer of aluminum. The drain terminal 40, and integral connection to the ITO electrode 20, is formed simultaneously with the column conductors. The TFT 11 comprises a layer 50 of polysilicon material regions of which, as indicated at 51 and 52, are doped to provide spaced source and drain regions. A layer 54 of insulating oxide covers the polysilicon layer 50 and has two windows through which the source and drain terminals 39 and 40 contact the source and drain regions 51 and 52. Between the regions 51 and 52 a further layer, 55, of doped polysilicon is provided as a gate layer over which the gate contact 37 of aluminum extends. The overlying doped polysilicon and aluminum materials used for the gate terminal also constitute the row conductors 14. The gate terminal 36 may instead comprise a number of individual fingers where it overlies the layer 50.

Underlying the area of the TFT 11 there is provided a metallic layer of a refractory metal such as molybdenum or tungsten constituting the TFT's light shield 45. This layer is defined directly on the surface of the plate 30 and is separated from the polysilicon layer 50, and adjacent regions of the oxide layer 54, by an insulating layer 56 also for example of oxide. The polysilicon layer 50 could be formed by laser recrystallization of amorphous silicon material in which case a metal other than a refractory metal, e.g. aluminum, can be used for the light shield 45 and the interconnection 46 as the temperatures involved are then comparatively low. The lower metal layer 45 is of strip shape and extends away from the TFT to form an interconnection portion 46 which contacts at its end 49 the adjacent row address conductor 14 associated with the immediately preceding, in addressing terms, row of picture elements. This contact is achieved through a window in the overlying insulating layer 56. As in the previous embodiment, the light shield 45 and interconnection 46 could comprise separately-formed layers.

The dimensions of the metallic light shield 45 are such that it covers completely the active region of the TFT 11, specifically the channel region, referenced at 57, extending between the doped source and drain regions 51 and 52 and also the source and drain contact regions themselves. The shield reflects light from its surface facing the plate 30 to prevent photocurrents being generated in the active region.

In operation light can be directed through the display device in either direction. With light directed through the plate 30 the active region of the TFT is screened from direct light by the shield 45 while the gate, source and drain contacts serve as additional masks to prevent light reflected internally from reaching the active region. Conversely, with light directed through the plate 31, the gate, source and drain contacts act to shield the active region from direct light while the light shield 45 screens against internally-reflected light, particularly light reflected at the interface between the plate 30 and the polarizing layer (not shown) carried on its outer surface.

With regard to both the above-described embodiments, the display devices can be used for direct view or in a projection system. Although the light shields 45 overlie, and bridge, the source and drain terminals of their respective TFTs, the consequences due to parasitic capacitances are minimal. For practically the entire field period, apart from the comparatively short duration of the gating pulse, the preceding row address conductor, and hence the light shield, is at a substantially constant reference potential, e.g. ground, as indicated in FIG. 3d so that any capacitive coupling effects caused by the light shield are negligible. Problems due to undesirable capacitance cross-talk are therefore avoided. Moreover, any effect on the display from the picture elements as a consequence of a gating pulse being applied to the preceding row address conductor is imperceptible as the picture elements are almost immediately thereafter refreshed with their intended display information during the succeeding row address period.

Of course, it will be appreciated that the provision of the light shields and interconnections with the preceding row address conductors can be implemented in a variety of ways different to the specific examples shown. As the shields and interconnections are substantially contained in the space between adjacent pairs of row and column address conductors their provision can be accomplished conveniently and in generally simple fashion without any insulated cross overs between the interconnections and row or column conductors being entailed.

The provision of light shields, or more precisely their interconnections, for those TFTs associated with the first row of picture elements require a slightly different approach. By way of example, the interconnections 46 associated with the first one of TFTs can be connected to a supplementary conductor which is positioned with respect to the first row of picture elements generally corresponding to the preceding row address conductor in FIGS. 3 and 5, the supplementary conductor being connected via a line extending in the column direction at the edge of the display panel 10 opposite the row driver circuit 20 to the last (mth) row address conductor 14 of the panel.

It should be understood that the particular examples of display devices described above are given by way of illustration only and that the invention, as defined in the appended claims, can be applied equally to other forms of active matrix display device construction, and especially alternative types of transistor structures, known in the art. Moreover, from reading the present disclosure, other modifications will be apparent to persons skilled in the art. These modifications may involve other features which are already known in the field of active matrix display devices and which may be used instead of or in addition to features already described herein.

I claim:

1. An active matrix liquid crystal display device comprising first and second spaced supporting plates, a row and column array of picture elements each defined by a respective one of a set of electrodes carried on the first plate and an opposing electrode carried on the second plate with liquid crystal material there between, and a set of row address conductors on the first plate to which selection signals are applied by a driver circuit, each row of the picture element electrodes on the first plate being connected to an associated one of the set of row address conductors through a respective switching device on the first plate, and a light shield for each switching device, said light shields being situated on the first plate, characterized in that each light shield comprises a layer of metal which is connected electrically to a row address conductor adjacent the one to which the switching device is connected.

2. An active matrix liquid crystal display device according to claim 1, characterized in that each light shield comprises a layer of metal extending from the switching device to, and electrically connecting with, the adjacent row address conductor.

3. An active matrix liquid crystal display device according to claim 2, characterized in that each light shield is connected to the preceding adjacent row address conductor.

4. An active matrix liquid crystal display device according to claim 3, characterized in that the light shield extends in superposition over the switching device with the switching device being situated between the light shield and the surface of the first plate.

5. An active matrix liquid crystal display device according to claim 3, characterized in that light shield extends under the switching device and between the switching device and the surface of the first plate.

6. An active matrix liquid crystal display device according to claim 2, characterized in that the light shield extends in superposition over the switching device with the switching device being situated between the light shield and the surface of the first plate.

7. An active matrix liquid crystal display device according to claim 2, characterized in that light shield extends under the switching device and between the switching device and the surface of the first plate.

8. An active matrix liquid crystal display device according to claim 1, characterized in that each light shield is connected to the preceding adjacent row address conductor.

9. An active matrix liquid crystal display device according to claim 8, characterized in that the light shield extends in superposition over the switching device with the switching device being situated between the light shield and the surface of the first plate.

10. An active matrix liquid crystal display device according to claim 8, characterized in that light shield extends under the switching device and between the switching device and the surface of the first plate.

11. An active matrix liquid crystal display device according to claim 1, characterized in that the light shield extends in superposition over the switching device, with the switching device being situated between the light shield and the surface of the first plate.

12. An active matrix liquid crystal display device according to claim 1, characterized in that light shield extends under the switching device and between the switching device and the surface of the first plate.

13. An active matrix liquid crystal display device according to claim 1, characterized in that the switching devices comprise amorphous silicon TFTs.

14. An active matrix liquid crystal display device according to claim 1, characterized in that the switching devices comprise polycrystalline silicon TFTs.

* * * * *